United States Patent
Furukawa et al.

(10) Patent No.: US 6,174,831 B1
(45) Date of Patent: Jan. 16, 2001

(54) DIELECTRIC CERAMIC COMPOSITION

(75) Inventors: Yukiko Furukawa, Yamato; Hitoshi Masumura, Tokyo, both of (JP)

(73) Assignee: U.S. Philips Corporation, New York, NY (US)

( * ) Notice: Under 35 U.S.C. 154(b), the term of this patent shall be extended for 0 days.

(21) Appl. No.: 09/318,325

(22) Filed: May 25, 1999

(30) Foreign Application Priority Data

May 27, 1998 (JP) .................................................. 10-162919

(51) Int. Cl.$^7$ .................................................. C04B 35/468

(52) U.S. Cl. ...................... 501/138; 501/139; 361/321.4; 361/321.5

(58) Field of Search .................................. 501/138, 139; 361/321.4, 321.5

(56) References Cited

U.S. PATENT DOCUMENTS 6,051,516 * 4/2000 Mizuno et al. ...................... 501/138

* cited by examiner

*Primary Examiner*—David Brunsman
(74) *Attorney, Agent, or Firm*—Norman N. Spain

(57) ABSTRACT

An object of the present invention is to provide a dielectric ceramic composition in which a volume changing ratio of the electrostatic capacity is within ±0.3% over a wide temperature range of −55 to +125° C., it satisfies the NPO characteristics regulated by EIA standard, the dielectric constant is high as 75 or more and the Q value of 2000 or higher and it is capable of subjecting to sintering at a low temperature of 1100 to 1150° C. The dielectric ceramic composition of the present invention is a (Ba Ca Sr Nd Gd)TiO$_3$ series composition and to the composition was added and contained 1.0 to 5.0% by weight of ZnSiTiO$_5$, 1.0 to 5.0% by weight of ZnSi$_2$TiO$_7$ or 1.0 to 5.0% by weight of CaSiTiO$_5$ based on the weight of the composition.

2 Claims, No Drawings

DIELECTRIC CERAMIC COMPOSITION

BACKGROUND OF THE INVENTION

This invention relates to a dielectric ceramic composition, particularly to a dielectric ceramic composition for high frequency used as a material for a dielectric resonance which is used at a microwave region or a dielectric for temperature compensation.

Accompanying with rapid progress of miniaturization, higher performance and low prices in high frequency apparatuses such as cellular phone, etc. in recent years, a dielectric resonance used in these high frequency apparatuses is also desired to be a small size, high performance and low price. As for the dielectric ceramic composition used as a material for these dielectric resonances, etc., those having such characteristics of high relative dielectric constant, high Q value and low temperature dependency in electrostatic capacity are required. When the relative dielectric constant is high, it is easy to make the resonance miniaturize, when the Q value is high, the dielectric loss of the resonance becomes small, and when the temperature dependency of the electrostatic capacity is low, fluctuation in characteristics as mentioned above against change in a surrounding temperature can be prohibited. Particularly, with regard to the temperature dependency of the electrostatic capacity, it is preferred to satisfy the NPO characteristics defined by the EIA standard. The NPO characteristics mean the characteristics that the temperature changing ratio of the electrostatic capacity is plateau as within ±0.3% over a wide temperature range of −55 to 125° C. based on the electrostatic capacity at +25° C. as the standard.

As the dielectric ceramic composition satisfying these characteristics, in Japanese Laid-Open Patent Application No. 7-187773 which is a Laid-Open Patent Publication in Japan, there is disclosed a dielectric ceramic composition using a substituted barium-neodium-titanium-perovskite. Moreover, it is also disclosed that the dielectric ceramic composition is possible to be subjected to low temperature sintering at 1400° C. or lower when silicon dioxide is contained as an additive in the substituted barium-neodium-titanium-perovskite. It is extremely important for making the cost of the dielectric ceramic composition low that the composition can be sintered at a low temperature for producing a dielectric ceramic composition. When the sintering temperature is high, electric power consumption becomes high, and a furnace for high temperature is required. Also, a setter, a sheath, etc. for entering a material of the dielectric ceramic composition into the said furnace for high temperature are required to be able to stand against high temperatures whereby a plant investment becomes enormous.

When a dielectric ceramic composition is used as a laminated ceramic capacitor, it has been known that it is effective to make the cost low if inexpensive Ag is used in place of the noble metals such as Pd, Pt, Au, etc. which had heretofore been used as an internal electrode or a large amount of Ag is mixed with the noble metal. Ag has a lower melting point as compared with the noble metals such as Pd, etc. so that a low temperature sintering is also desired for using inexpensive Ag as the internal electrode.

SUMMARY OF THE INVENTION

It is an object of the invention to provide a dielectric ceramic composition having a high relative dielectric constant and a Q value, satisfying the NPO characteristics and capable of being subjected to subjecting to low temperature sintering at a sintering temperature of 1100 to 1150° C.

The dielectric ceramic composition of the present invention comprises a ceramic composition containing (Ba Ca Sr Nd Gd)TiO$_3$ to which 1.0 to 5.0% by weight of ZnSiTiO$_5$, and/or 1.0 to 5.0% by weight of ZnSi$_2$TiO$_7$ and/or 1.0 to 5.0% by weight of CaSiTiO$_5$ is added based on the weight of the composition. The ceramic composition containing (Ba Ca Sr Nd Gd)TiO$_3$ preferably comprises a composition represented by the formula (sBaO,tCaO,uSrO,vR'O,wr) TiO3 as a main component. Here, R' is at least one rare earth metal of Nd or Gd, r is a defect, and s, t, u, v, w are s+t+u+v+w=100 mol %, s is in the range of 20 to 25 mol %, t is 3 to 6 mol %, u is 1.5 to 2.5 mol %, v is 45 to 47 mol % and w is 23 to 25 mol %. To the main component, 0.5 to 2.0% by weight of SiO$_2$ is added as a subsidiary component.

The dielectric ceramic composition of the present invention has a relative dielectric constant of 75 or more a Q value of 2000 or higher, the temperature dependency of the dielectric constant of which satisfies the NPO characteristics and is capable of being subjected to low temperature sintering at a sintering temperature of 1100 to 11 50° C. A preferred use of the composition of the present invention is in a ceramic capacitor.

DETAILED DESCRIPTION OF THE INVENTION

The process for producing the dielectric ceramic composition according to the present invention will now be described. By referring to the table showing electric characteristics of the dielectric ceramic composition produced by the said producing method and the compositions of these dielectric ceramic compositions, examples of the present invention are explained in detail.

The dielectric ceramic composition having (Ba Ca Sr Nd Gd)TiO$_3$ was prepared as mentioned below. Using BaCO$_3$, CaCO$_3$, SrCO$_3$, Nd$_2$O$_3$, Gd$_2$O$_3$, TiO$_2$ and SiO$_2$ as starting materials, they were weighed to have a desired composition, and the mixture was wet-mixed by using water as a solvent and yttria-stabilized zirconia balls for 3 hours and then dried. The mixed powder material obtained after drying was calcined at 1130° C. for 2 hours, then wet-pulverized by using water as a solvent and yttria-stabilized zirconia balls for 3 hours and dried to obtain (BaCaSrNdGd)TiO$_3$. The additive of CaSiTiO$_5$ was prepared as mentioned below. Using SiO$_2$, TiO$_2$ and CaCO$_3$ as starting materials, they were weighed to have a desired composition, and the mixture was wet-mixed by using water as a solvent and yttria-stabilized zirconia balls for 3 hours and then dried. The mixed powder material obtained after drying was calcined at 1050° C. for 2 hours, then wet-pulverized by using water as a solvent and yttria-stabilized zirconia balls for 3 hours and dried to obtain an additive of CaSiTiO$_5$. An additive of ZnSiTiO$_5$ or ZnSi$_2$TiO$_7$ was obtained in the same manner as mentioned above by using ZnO, SiO$_2$ and TiO$_2$ as starting materials.

The additive of ZnSiTiO$_5$, and/or ZnSi$_2$TiO$_7$ and/or CaSiTiO$_5$ thus obtained was added to the above-mentioned ceramic composition containing (Ba Ca Sr Nd Gd)TiO$_3$ by changing the amount to be added, and wet-mixing was carried out by using water as a solvent and yttria-stabilized zirconia balls for 20 hours. An organic material binder was added to the thus obtained mixed powder to effect granulation. By using the thus prepared powder, a disc shaped sample with a size having a thickness of 0.7 mm was subjected to mono-axial pressure molding by a press molding machine under a surface pressure of 3 ton/cm$^2$ at 16.5 mmF, then sintered at 1100 to 1150° C. for 2 hours in air.

With regard to the single plate type capacitors of these obtained sintered bodies, the relative dielectric constant (∈r)

and the Q value were measured at the conditions of 1 MHz and 1 Vrms using an automatic bridge type measuring device. Also, temperature dependency (ppm/° C.) of the electrostatic capacity was made the electrostatic capacity at 25° C. the standard, and the temperature dependency of the electrostatic capacity at −55 to +125° C. was measured. Table 1 shows characteristics of the sintered bodies, i.e., the single plate type capacitors of the sintered bodies by adding the additive of $ZnSiTiO_5$, and/or $ZnSi_2TiO_7$ and/or $CaSiTiO_5$ to the ceramic composition containing $(BaCaSrNdGd)TiO_3$, respectively.

weight. In this case, the temperature dependency of the electrostatic capacity was increased, the Q value was markedly lowered and the relative dielectric constant was low whereby bad effects were exerted to the electric characteristics. Sample 10 is the case where the additive of $ZnSi_2TiO_7$ being 7.0% by weight. Also in this case, the temperature dependency of the electrostatic capacity was increased, the relative dielectric constant and the Q value were lowered whereby bad effects are exerted to the electric characteristics. Accordingly, it could be understood that the additive of $ZnSi_2TiO_7$ is preferably within the range of 1.0 to 5.0% by weight.

TABLE 1

| No. | Ceramic composition containing $(BaCaSrNdGd)TiO_3$ (mol %) | | | | | | | Additive (wt %) | | | Sintering temperature | Electric characteristics | | |
|---|---|---|---|---|---|---|---|---|---|---|---|---|---|---|
| | BaO | CaO | SrO | $Nd_2O_3$ | $Gd_2O_3$ | $TiO_2$ | $SiO_2$ | $ZnSiTiO_5$ | $ZnSi_2TiO_7$ | $CaSiTiO_5$ | Sintering time | εr | Q | ppm/° C. |
| *1 | 23 | 5 | 2 | 13 | 10 | 100 | 4 | 0.5 | 0.0 | 0.0 | 1100° C., 2 hr | 65.5 | 310 | −69 |
| 2 | 23 | 5 | 2 | 13 | 10 | 100 | 4 | 1.0 | 0.0 | 0.0 | 1100° C., 2 hr | 82.2 | 5000 | −17 |
| 3 | 23 | 5 | 2 | 13 | 10 | 100 | 4 | 2.0 | 0.0 | 0.0 | 1100° C., 2 hr | 82.3 | 3300 | −14 |
| 4 | 23 | 5 | 2 | 13 | 10 | 100 | 4 | 5.0 | 0.0 | 0.0 | 1100° C., 2 hr | 75.2 | 2500 | −25 |
| *5 | 23 | 5 | 2 | 13 | 10 | 100 | 4 | 7.0 | 0.0 | 0.0 | 1100° C., 2 hr | 68.3 | 1800 | −29 |
| *6 | 23 | 5 | 2 | 13 | 10 | 100 | 4 | 0.0 | 0.5 | 0.0 | 1100° C., 2 hr | 71.5 | 590 | −60 |
| 7 | 23 | 5 | 2 | 13 | 10 | 100 | 4 | 0.0 | 1.0 | 0.0 | 1100° C., 2 hr | 81.4 | 4000 | −24 |
| 8 | 23 | 5 | 2 | 13 | 10 | 100 | 4 | 0.0 | 2.0 | 0.0 | 1100° C., 2 hr | 79.4 | 2900 | −25 |
| 9 | 23 | 5 | 2 | 13 | 10 | 100 | 4 | 0.0 | 5.0 | 0.0 | 1100° C., 2 hr | 75.3 | 2200 | −30 |
| *10 | 23 | 5 | 2 | 13 | 10 | 100 | 4 | 0.0 | 7.0 | 0.0 | 1100° C., 2 hr | 67.8 | 1300 | −48 |
| *11 | 23 | 5 | 2 | 13 | 10 | 100 | 4 | 0.0 | 0.0 | 0.5 | 1100° C., 2 hr | 72.5 | 280 | −22 |
| 12 | 23 | 5 | 2 | 13 | 10 | 100 | 4 | 0.0 | 0.0 | 1.0 | 1150° C., 2 hr | 88.8 | 6700 | 8 |
| 13 | 23 | 5 | 2 | 13 | 10 | 100 | 4 | 0.0 | 0.0 | 2.0 | 1150° C., 2 hr | 85.6 | 3300 | 2 |
| 14 | 23 | 5 | 2 | 13 | 10 | 100 | 4 | 0.0 | 0.0 | 5.0 | 1150° C., 2 hr | 87.5 | 2000 | −28 |
| *15 | 23 | 5 | 2 | 13 | 10 | 100 | 4 | 0.0 | 0.0 | 7.0 | 1150° C., 2 hr | 77.2 | 1200 | −47 |

*Outside the scope of the present invention

Samples 1 to 5 are the case where the additive is $ZnSiTiO_5$, and the ceramic compositions containing (Ba Ca Sr Nd Gd)$TiO_3$ have the same component except that the weight % of the additive is different. In the case where the additive of ZnSiTiO5 is within the range of 1.0 to 5.0% by weight, sintering at the sintering temperature of 1100° C. for 2 hours is sufficient whereby characteristics that the relative dielectric constant of 75 or more, the Q value of 2000 or higher and the temperature changing ratio of the electrostatic capacity of 30 ppm/° C. or lower can be obtained. Sample 1 is the case where the additive of ZnSiTiO5 being 0.5% by weight. In this case, the temperature dependency of the electrostatic capacity was increased, the Q value was markedly lowered and the relative dielectric constant was low whereby bad effects were exerted to the electric characteristics. Sample 5 is the case where the additive of $ZnSiTiO_5$ being 7.0% by weight. Also in this case, the temperature dependency of the electrostatic capacity was increased, the relative dielectric constant and the Q value were lowered whereby bad effects were exerted to the electric characteristics. Accordingly, it could be understood that the additive of $ZnSiTiO_5$ is preferably within the range of 1.0 to 5.0% by weight.

Samples 6 to 10 are the case where the additive is $ZnSi_2TiO_7$, and the ceramic compositions containing (Ba Ca Sr Nd Gd)$TiO_3$ have the same component except that the weight % of the additive is different. In the case where the additive of $ZnSi_2TiO_7$ is within the range of 1.0 to 5.0% by weight, sintering at the sintering temperature of 1100° C. for 2 hours is sufficient whereby characteristics that the relative dielectric constant of 75 or more, the Q value of 2000 or higher and the temperature changing ratio of the electrostatic capacity of 30 ppmn/° C. or lower can be obtained. Sample 6 is the case where the additive of $ZnSi_2TiO_7$ being 0.5% by Samples 11 to 15 are the case where the additive is $CaSiTiO_5$, and the ceramic compositions containing (Ba Ca Sr Nd Gd)$TiO_3$ have the same component except that the weight % of the additive is different. In the case where the additive of $CaSiTiO_5$ is within the range of 1.0 to 5.0% by weight, sintering at the sintering temperature of 1100° C. for 2 hours is sufficient whereby characteristics that the relative dielectric constant of 75 or more, the Q value of 2000 or higher and the temperature changing ratio of the electrostatic capacity of 30 ppm/° C. or lower can be obtained. Sample 11 is the case where the additive of $CaSiTiO_5$ being 0.5% by weight. In this case, the Q value was markedly lowered and the relative dielectric constant was low whereby bad effects were exerted to the electric characteristics. Sample 15 is the case where the additive of $CaSiTiO_5$ being 7.0% by weight. Also in this case, the temperature dependency of the electrostatic capacity was increased, the relative dielectric constant and the Q value were lowered whereby bad effects were exerted to the electric characteristics. Accordingly, it could be understood that the additive of $ZnSiTiO_5$ is preferably within the range of 1.0 to 5.0% by weight.

Other preferred example of the present invention is a dielectric ceramic composition to be used for a laminated ceramic capacitor.

In the same manner as mentioned above, a ceramic composition containing an additive of $ZnSiTiO_5$, and/or $ZnSi_2TiO_7$ and/or $CaSiTiO_5$ and (Ba Ca Sr Nd Gd)$TiO_3$ was obtained. To the ceramic composition containing (Ba Ca Sr Nd Gd)$TiO_3$ was added an additive of $ZnSiTiO_5$, and/or $ZnSi_2TiO_7$ and/or $CaSiTiO_5$, and wet mixing was carried out by using water as a solvent and yttria stabilized zirconia balls for 20 hours. To the thus obtained mixed powder was added an organic material binder and the mixture was subjected to wet mixing to prepare a ceramic slip. This ceramic slip was subjected to sheet molding by the doctor blade method to obtain a rectangular green sheet having a thickness of 21 $\mu$m. Next, a conductive paste comprising a mixture of Pd and Ag was printed on the ceramic green sheet to form an internal electrode. A plural number of the above-mentioned ceramic green sheets to which the internal electrode was formed were laminated so that the side in which the conductive paste layer is drawn out is alternate to obtain a laminated material. The above-mentioned laminated material was sintered in air at 1100 to 1150° C. for 2 hours. After sintering, silver pastes were coated on the both surfaces of the ceramic sintered body and baked in air at 750° C. to form an external electrode which was electrically connected to the internal electrode.

The external dimension of the laminated ceramic capacitor thus obtained was the width of 3.2 mm, the length of 1.6 mm and the thickness of 0.5 mm. Also, the thickness of the respective dielectric ceramic layer interposed between the above-mentioned internal electrodes was 10 $\mu$m, and the total number of the effective dielectric ceramic layers was 5. The characteristics of the thus obtained dielectric ceramic composition were sufficient by the sintering at the sintering temperature of 1100 to 1150° C. for 2 hours, and the relative dielectric constant of 75 or more, the Q value of 2000 or higher and the temperature changing ratio of the electrostatic capacity being 30 ppm/° C. or less.

What is claimed is:

1. A dielectric ceramic composition which comprises a ceramic composition containing (Ba Ca Sr Nd Gd)TiO$_3$ to which 1.0 to 5.0% by weight of ZnSiTiO$_5$, and/or 1.0 to 5.0% by weight of ZnSi$_2$TiO$_7$ and/or 1.0 to 5.0% by weight of CaSiTiO$_5$ is added based on the weight of the composition.

2. A capacitor having the dielectric ceramic composition according to claim 1.

* * * * *